March 21, 1939.  C. E. LUCKE  2,151,297
APPARATUS FOR THE OPERATION OF STEAM BOILERS AND ACCESSORY DEVICES
Filed Feb. 20, 1937  2 Sheets-Sheet 1
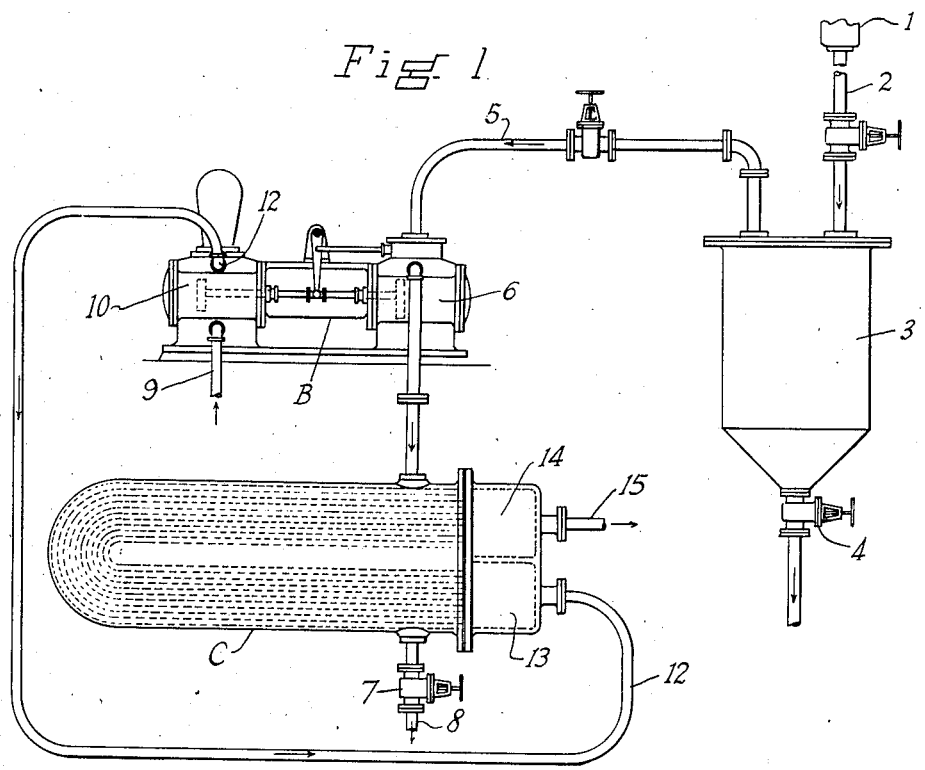
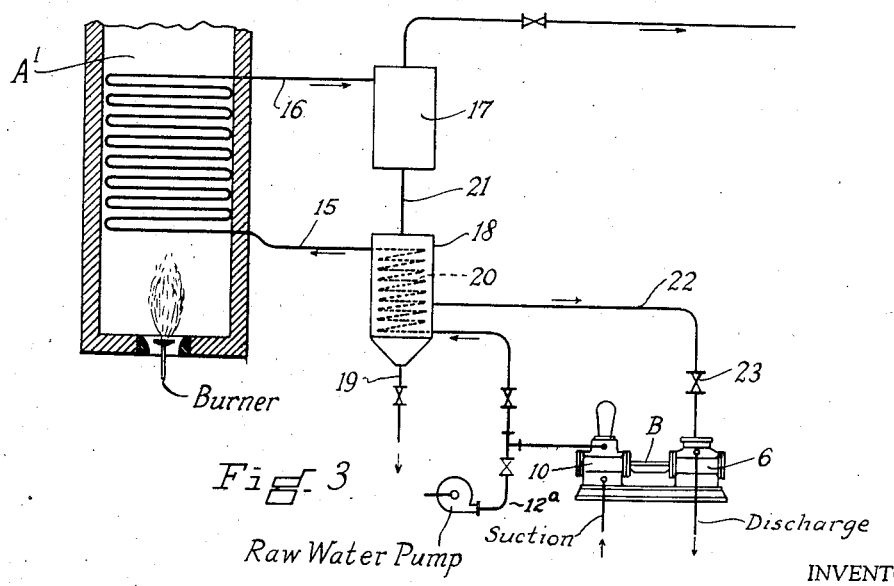
INVENTOR.
Charles E. Lucke
BY
ATTORNEY.

March 21, 1939.  C. E. LUCKE  2,151,297
APPARATUS FOR THE OPERATION OF STEAM BOILERS AND ACCESSORY DEVICES
Filed Feb. 20, 1937  2 Sheets-Sheet 2

Fig. 2

Steam Turbine
Condenser
Condensate Discharge
Feed Water Treatment
Mud Trap
Hot Well
Oil or Pulverized Coal Burner
Closed Feed Water Heater
Make-Up
Blow Down Make-up
Float Valve Control INVENTOR.
Charles E. Lucke
BY
ATTORNEY.

Patented Mar. 21, 1939

2,151,297

UNITED STATES PATENT OFFICE 2,151,297

APPARATUS FOR THE OPERATION OF STEAM BOILERS AND ACCESSORY DEVICES

Charles E. Lucke, New York, N. Y., assignor to The Babcock & Wilcox Company, Newark, N. J., a corporation of New Jersey Application February 20, 1937, Serial No. 126,748

4 Claims. (Cl. 122—1)

This invention is a steam generating system wherein both the heat and energy from a continuous blow down, removing solids and reducing concentration, are recovered.

In the past it has been customary in steam generating systems to recover heat from a continuous blow down but the energy due to pressure potential has been lost. With present day boilers of relatively small water storage operating at maximum capacity with high pressures and a high degree of superheat it has become increasingly important to treat the water to eliminate formation of scale and inhibit corrosion; however, as such treatment is effected solids are accumulated in sedimentary form and must be removed in order to eliminate possibility of overheating of heat transfer surface, thus the continuous blow down of a steam generator in a manner to control concentration and remove accumulated solids is becoming more and more a necessity as boiler operation at higher and higher ratings becomes the general practice.

Therefore, an object of this present invention is a method and apparatus for operation of a steam generator with continuous blow down while recovering both heat and energy of the blow down due to pressure potential.

Another feature of the invention is to accomplish the blow down and recovery of heat while utilizing the energy of the blow down due to pressure potential for returning water to the boiler.

An additional feature is the arrangement whereby with the recovery of both the energy due to pressure potential and heat, water is constantly fed to the boiler in proportion to the amount of blow down through utilization of the pressure of the blow down in such manner that the volumetric efficiency of the system is at a high level.

In the accompanying drawings forming a part of this specification I have diagrammatically illustrated apparatus for carrying the present invention into practice. In these drawings:

Fig. 1 illustrates, in side elevation, the necessary apparatus to be incorporated in any steam generating system for accomplishing the objects of the invention.

Fig. 2 is a diagrammatic view showing the apparatus of Fig. 1 incorporated in a complete steam power plant.

Fig. 3 is a diagrammatic view showing apparatus similar to that of Fig. 1 and used with a forced flow boiler.

In the arrangement illustrated in Fig. 1 a boiler, not shown, has its blow down from the mud drum 1 connected by a valved pipe 2 to a sludge trap 3, the valve discharge 4 of this sludge trap is opened from time to time for the elimination of sludge.

The blow down passes from the sludge trap 3 through a top outlet connected by a valved pipe 5 to the power cylinder 6 of a reciprocating, double-acting, direct-acting pump B, which is of the usual type identical with a steam driven pump and which type is well known in the art for boiler feed purposes.

The exhaust from the power cylinder 6 of the pump B is connected to the shell of a closed feed water heater C, and the blow down then passes to waste through the throttling valve 7 which, if desired, may be of the metering type, and is incorporated in the discharge 8 from said feed water heater. The make-up water to the boiler enters the suction 9 of the pumping end 10 of the double-acting, direct-acting pump B, and is discharged through the pipe 12 to the chamber 13 communicating with the internal tubes of the feed water heater C, and from which the water emerges to the chamber 14 and through the outlet pipe 15 by which it is conveyed to the boiler. Any suitable device for feed water treatment for elimination of scale-forming substances may be interposed in the system to meet specific conditions, such feed water treatment devices being well known in the art.

In Fig. 2 the arrangement as shown is incorporated in a complete steam power plant system and corresponding components are designated by the same reference characters as in Fig. 1. However, the arrangement of Fig. 2 discloses a natural circulation boiler A receiving feed water through the connection 15 from the closed feed water heater C which, unlike Fig. 1, is incorporated in the system in advance of the pump B in so far as receiving the blow down is concerned. The pump B takes its suction from the hot well shown which receives new water through the make-up connection which is float valve controlled and also receives the condensate from the condenser of the steam turbine. The boiler A may be of any particular type and, as shown, is fired by an oil or pulverized coal burner.

In Fig. 3 corresponding parts are designated by the same reference characters as used in Figs. 1 and 2, except that here the boiler A' may be of the forced circulation type wherein a multiplicity of long small bore tubular paths, of which only one is indicated at 16, discharge into a steam and water separator 17, the water discharge of which enters the combined closed feed water heater and sludge trap 18 from which the sludge may be withdrawn at intervals through the valved pipe 19. The interior coils 20 of the combined sludge trap and feed water heater receive on the outside through the connection 21 such excess water as is circulated through the multiple long small bore flow paths 16 to keep them wet at all times, regardless of the amount of steam generated, while new water is fed to the steam generator A' through the valved connection 12ª communicating with the internal coils 20 and the connection 15 conveying the water from the coils 20 to the multiple coils 16 of the boiler A'. In this instance the supply line 22 to the power cylinder 6 contains the valve 23 in advance of the pump cylinder. The water cylinder of the pump may receive its supply through the suction which is connected with any suitable source, such as the hot well shown in Fig. 2, or the like, while the final discharge of the blow down is utilized if desired to also heat the hot well.

It is a well known fact that the double-acting, direct-acting steam pump of which the pump B is a counterpart takes steam full stroke so that the steam piston displacement is also proportional to that of the water piston. If, as in the arrangement shown in the drawings, the blow down from a boiler is connected to the power cylinder of the double-acting, direct-acting pump B and the pump cylinder is connected to feed the boiler, it will always be true that proportionality will exist between feed water going to the boiler and blow down coming from the boiler. It is in this way that the energy of the blow down is utilized while at the same time the heat of the blow down is recovered through the feed water heater C, in Figs. 1 and 2, and 18, in Fig. 3.

The pump B is a reciprocating, double-acting, direct-acting pump which, when connected to receive the blow down water, as shown, for its power end, takes such water throughout its full stroke, there being no question of expansion involved, also the pump or water end of the pump has its piston operating at a substantially constant resistance throughout its full stroke so that the displacement on the power end operated by the blow down is proportional to the displacement of the pumping or water end. Consequently, the energy of the blow down is thus used for direct displacement of the amount of water leaving the system through the blow down.

Regulation of the amount and rate of blow down and replacement is from a flow control valve placed either in the blow down exhaust line from the power cylinder of the pump as shown in Figs. 1 and 2 or in the blow down line ahead of the pump as shown in Fig. 3, the advantage being in favor of the latter position.

I claim—

1. In combination, a steam generator with feed water supply and blow down systems, a blow down energy driven power device and pump operated thereby, both of the positive displacement type, means connecting the blow down to the device, and means connecting the feed water supply to the pump and from the pump to the generator, whereby the rate of blow down governs the rate of blow down replacement.

2. In combination, a steam generator with feed water supply and blow down systems, a blow down energy driven power device and pump operated thereby, both of the reciprocating double acting positive displacement type, means connecting the feed water supply to the pump and from the pump to the generator, whereby the rate of blow down governs the rate of blow down replacement.

3. In combination, a steam generator with feed water supply and blow down systems, a blow down energy driven power device and pump operated thereby, both of the positive displacement type, means connecting the blow down to the device, means connecting the feed water supply to the pump and from the pump to the generator, whereby the rate of blow down governs the rate of blow down replacement, and means regulating the rate of blow down.

4. In combination, a steam generator with feed water supply and blow down systems, a blow down energy driven power device and pump operated thereby, both of the reciprocating double acting positive displacement type, means connecting the feed water supply to the pump and from the pump to the generator, whereby the rate of blow down governs the rate of blow down replacement, and means regulating the rate of blow down.

CHARLES E. LUCKE.